April 11, 1967 E. R. HIGGINS, JR 3,314,055

MULTIAPERTURE MAGNETIC STORAGE DEVICE

Filed May 31, 1963

WITNESSES

Theodore T. Wrobel

James F. Young

INVENTOR

Edward R. Higgins Jr.

BY Ernest P. Klipfel

ATTORNEY

United States Patent Office 3,314,055

Patented Apr. 11, 1967

3,314,055

MULTIAPERTURE MAGNETIC STORAGE DEVICE

Edward R. Higgins, Jr., North Linthicum, Md., assignor to Westinghouse Electric Corporation, Pittsburgh, Pa., a corporation of Pennsylvania Filed May 31, 1963, Ser. No. 284,623

3 Claims. (Cl. 340—174)

Figure 1:
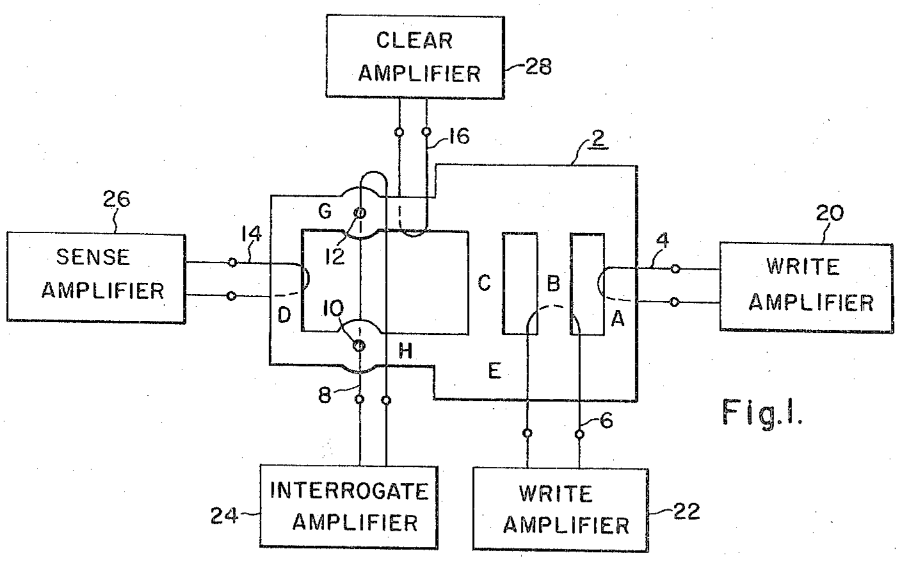

The present invention relates generally to magnetic devices and more particularly relates to a multiple aperture memory cell for coincident writing under wide temperature variations and which also is a nondestructive readout cell.

Ferrite magnetic cores have been used extensively in computer memory applications where the temperature can be controlled within relatively narrow limits, 0° C. to 60° C. Since the coercive force $H_c$ of the material varies with temperature it is impractical to consider using this material parameter as a direct threshold device for coincident current writing over wide temperature changes. The capability of being written into by the coincidence of two magnetomotive forces degrades with a change in temperature to the extent that memories tend to be limited to temperatures of 20° C. plus or minus 10° C. This is a serious limitation for missiles, satellite aircraft and other specialized applications. Also, the coercive force $H_c$ of the material directly limits the speed at which information can be written into an element.

My copending application Ser. No. 267,204, filed Mar. 22, 1963, and assigned to the same assignee, describes and claims a nondestructive readout memory cell capable of being read under wide deviations in temperature. However, the device described and claimed therein has writing limitations with respect to operating temperatures of the type described previously.

The present invention is a multiple aperture memory element which combines the nondestructive readout capabilities of a memory cell with means for coincident flux writing into the element over a wide range of temperature variations.

Accordingly, an object of the present invention is to provide a magnetic device combining the advantages of coincident flux writing with a nondestructive readout in a practical manufacturable memory cell.

Another object of the present invention is to provide a magnetic device for a logic memory function wherein writing into the core is not limited by the coercive force of the magnetic material.

Another object of the present invention is to provide a multiple aperture memory cell allowing the use of magnetic material having common reasonable square loop characteristics.

Another object of the present invention is to provide a multiple aperture memory cell capable of fast switching times.

Another object of the present invention is to provide a multiple aperture cell wherein coincident writing and nondestructive readout may be attained in a configuration readily and inexpensively manufactured.

Briefly, selected portions of the magnetic element are driven by coercive forces greatly exceeding the magnitude of coercive force $H_c$, the magnetizing force at which the flux density is zero when the material is being symmetrically cyclically magnetized. Other portions of the magnetic element are provided with means for nondestructive readout of the information stored within the memory element. Both writing and readout are accomplished without hinderous effects from wide operating temperature variations.

Figure 2A:
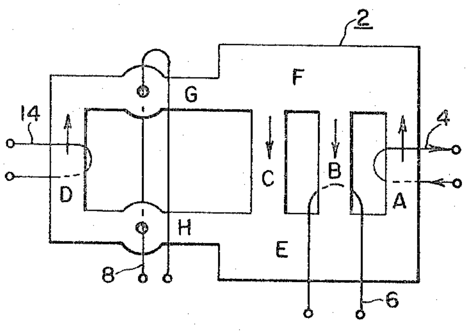
Figure 2B:
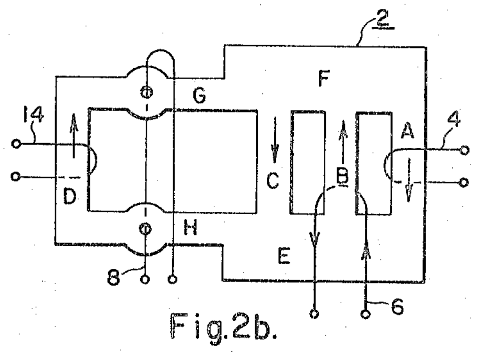
Figure 2C:
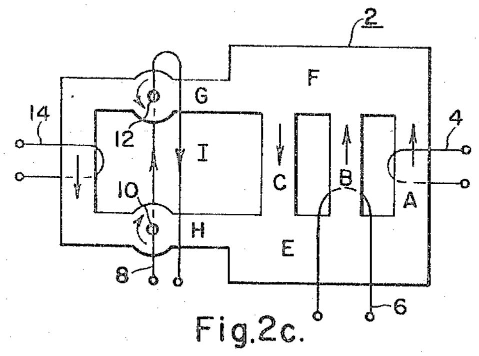
Figure 3:
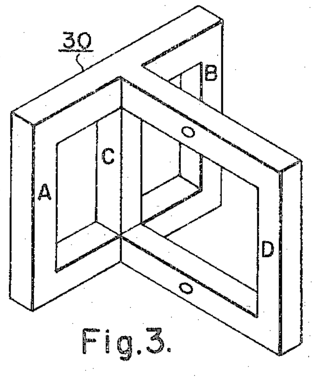

Further objects and advantages of the present invention will be readily apparent from the following detailed description taken in conjunction with the drawing, in which:

FIGURE 1 is a schematic block diagram of an illustrative embodiment of the present invention;

FIGS. 2*a*, 2*b* and 2*c* are schematic represenations for a better understanding of the present invention; and FIG. 3 is an isometric elevational view of an alternate embodiment of the present invention.

Referring to FIG. 1, it can be seen that the magnetic element 2 has a plurality of legs; namely, legs A, B and C of substantially equal length commonly connected together by legs E and F to a leg of greater length made up of portions D, G and H. The legs A, B, C, D, G and H are of approximately equal cross section while legs E and F are substantially twice the cross section of leg A. The core 2 is chosen to be of magnetic material having two remanent flux states and is chosen to have the flux density versus magnetomotive force characteristic curve of the well known square hysteresis loop type.

Inductively disposed on legs A and B are write windings 4 and 6, respectively. An interrogate winding 8 is threaded through two minor apertures 10 and 12 in the legs H and G, respectively. A sense winding 14 is inductively disposed on the leg D. When desired, a clear winding 16 may be inductively disposed on one of the portions comprising the longer leg including leg D and is herein illustrated as being inductively disposed on the leg G. A write amplifier 20 is connected to provide excitation to the write winding 4 while a second write amplifier 22 is connected to provide excitation to the write winding 6. An interrogate amplifier 24 is connected to supply excitation to the interrogate winding 8. A sense amplifier 26 is connected to sense the voltages induced in the sense winding 14. When the clear winding 16 is used a clear amplifier 28 is operably connected thereto to provide excitation for clearing the information stored in the leg D as will be explained more fully hereinafter.

Information will be directly written into the legs A and B with the leg D forming a flux path therewith. The condition of the flux in the leg D will be indicative of the information stored within the memory element.

Assume initially that the remanent flux condition in the core D is in the direction indicated by the arrow and is indicative of a stored binary ZERO in the memory element. FIGURE 2*a* indicates such flux conditions in the element 2 with an excitation current flowing in the input winding 4. The excitation is of sufficient magnitude to quickly overdrive the coercive force $H_c$ of the leg A. In other words, the coercive force applied by the input winding 4 on the leg A is of sufficient magnitude to exceed the coercive force $H_c$ of the material regardless of the value of the coercive force $H_c$ for the operating temperature. With such a driving force the flux in leg A saturates thereby limiting any further increase in magnitude of the flux that can result from the excitation of the input winding 4. The resultant flux is effectively shunted from the leg D by the legs B and C and therefore has very little effect upon the condition of the remanent flux stored in leg D.

FIG. 2*b* indicates the flux condition of the magnetic element with a binary ZERO stored in the leg D and a current excitation on the input winding 6 only. With current in the direction indicated by the arrows the flux in the B leg is saturated by overdriving but this flux is also shunted from the D leg by its two neighbor legs A and C. Again, the flux condition in the leg D remains unaffected.

FIG. 2*c* indicates the flux conditions within the element 2 with excitation coincidentally provided to both input windings 4 and 6. It is to be noted that the leg C is of insufficient cross-sectional area to shunt the combined effect of the saturation fluxes induced in legs A and B and therefore the remanent flux condition in leg D is forced to reverse.

By considering all possibilities of drive it can be seen that the only time that flux can be changed in leg D is when the drives are simultaneously of such a polarity that they induce fluxes opposing the flux stored in leg D. The flux state of leg D can be considered to be dependent upon the condition of coincident fluxes occurring in legs A and B. It is to be noted that the exact magnetomotive forces drives applied to legs A and B do not directly effect storage of information since each is overdriven by a coercive force greatly exceeding the coercive force $H_c$ of the material and therefore the variation of the coercive force $H_c$ of the material with wide temperature variations is not of prime consideration.

It should be apparent that the flux condition within the leg D can be altered or cleared by merely changing the polarity of the excitation provided coincidentally to the drive windings 4 and 6. Information stored in leg D can also be cleared to a given direction in another manner. As indicated in FIG. 1, the clear amplifier 28 can provide an excitation of suitable amplitude and polarity to the clear winding 16, when desirable, to reset the flux condition within the leg D.

A method of reading out nondestructively the flux stored in leg D is described in detail and claimed in the aforementioned copending application.

Briefly, referring to FIG. 2*c*, an excitation current I provided on the interrogate winding 8 threaded through the two small apertures 10 and 12 in portions H and G, and having a direction as indicated by the arrow, will tend to induce clockwise flux around the aperture 10 and counterclockwise flux around the aperture 12. The flux stored in leg D is summed with the fluxes resulting from the interrogate current I in the square loop, nonlinear magnetic material. The result is that the effective differential permeability of the magnetic path seen by the stored flux is decreased by the presence of current in the interrogate winding 8. With the decrease in permeability, the stored flux is caused to decrease which induces a voltage into the sense winding 14. Upon removal of the interrogate current the original flux stored in leg D is returned due to the stored magnetomotive force. The polarity of the output pulse induced in the winding 14 indicates the direction of remanent flux condition within the core D. The process can be repeated indefinitely with no permanent loss in flux stored in the leg D.

The interrogate excitation, I, always causes the flux in leg D to decrease in magnitude, regardless of the polarity of either the interrogate current I or the direction of the stored flux. The polarity of either output signals is thus independent of the direction of the interrogate current I; interrogate currents of either polarity can be used. The stored flux in the longer leg including legs D, G and H can be considered to be modulated by the flux resulting from currents in the interrogate winding 8.

Another configuration of a magnetic element 30 is as illustrated in FIG. 3. While the three dimensional geometry shown is more difficult to fabricate somewhat better electrical properties can be obtained. It is to be noted that the leg C is positioned common with the legs A, B and D and is in a position to shunt flux induced in either leg A or leg B but is again chosen of insufficient cross-sectional area to be capable of shunting both the flux induced in legs A and B when they are coincidentally excited. Accordingly, under these conditions the flux condition in leg D will be altered to provide a return flux path.

It is now readily apparent that the present invention has provided a multiple aperture element for wide temperature operation in which writing is not limited by the coercive force $H_c$ values of the material. The use of coercive forces greatly exceeding the $H_c$ value of the material also provides a corresponding increase in the speed of writing information into the element. Materials with low values of $H_c$ can be used that switch fast with larger drives. At the same time non-destructive readout of the information contained in the element can be readily obtained. The present invention combines the advantages of coincident flux writing with a nondestructive readout in a practical manufacturable memory cell.

While the present invention has been described with a degree of particularity for the purposes of illustration, it is to be understood that all alterations, modifications and substitutions within the spirit and scope of the present invention are herein meant to be included.

I claim as my invention:

1. An element of magnetic material having two remanent states; first, second and third legs of said element being of substantially equal length and cross-sectional area; a fourth leg of longer length but of substantially equal cross-sectional area; said fourth leg having two apertures therethrough; and other portions of said element interconnecting the flux within said legs and having cross-sectional areas substantially twice the cross-sectional area of the aforementioned legs.

2. In combination, an element of magnetic material having two remanent states and a plurality of portions; first, second and third portions offering similar flux paths; a fourth portion disposed adjacent said third portion and offering a flux path of greater reluctance; write winding means inductively disposed on each said first and second portions; half write amplifier means operatively connected to each said write winding for providing an excitation to saturate each said first and second portion in a predetermined direction; said third portion shunting the flux saturation from said fourth portion when only one said first and second portion is flux saturated; said fourth portion having two apertures therethrough; interrogate winding means threaded through said apertures of the fourth leg; interrogate amplifier means operatively connected to said interrogate winding for providing an excitation to induce a reversible flux change in said fourth portion; output winding means inductively disposed on said fourth portion; and sense amplifier means operatively connected to said output winding for sensing the voltage induced therein when excitation is provided by said interrogate amplifier means to said interrogate winding.

3. The combination as claimed in claim 2 including a clear winding inductively disposed on said fourth portion and clear amplifier means operatively connected to said clear winding for clearing the remanent flux condition within said fourth portion.

References Cited by the Examiner

UNITED STATES PATENTS

| | | | |
|---|---|---|---|
| 2,519,426 | 8/1950 | Grant | 340—174 |
| 2,918,663 | 12/1959 | Tung Chang Chen | 340—174 |
| 3,056,118 | 9/1962 | Woods | 340—174 |

FOREIGN PATENTS

| | | |
|---|---|---|
| 848,833 | 9/1960 | Great Britain. |

BERNARD KONICK, *Primary Examiner.*

S. M. URYNOWICZ, *Assistant Examiner.*